(12) United States Patent
Lottermann et al.

(10) Patent No.: US 10,506,001 B2
(45) Date of Patent: Dec. 10, 2019

(54) METHOD FOR TRANSMITTING DATA SETS TO MOBILE TERMINALS

(71) Applicant: Bayerische Motoren Werke Aktiengesellschaft, Munich (DE)

(72) Inventors: Christian Lottermann, Munich (DE); David Gozalvez Serrano, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 44 days.

(21) Appl. No.: 15/499,263

(22) Filed: Apr. 27, 2017

(65) Prior Publication Data

US 2017/0230435 A1    Aug. 10, 2017

Related U.S. Application Data

(63) Continuation of application No. PCT/EP2015/067798, filed on Aug. 3, 2015.

(30) Foreign Application Priority Data

Oct. 28, 2014   (DE) .......... 10 2014 221 958

(51) Int. Cl.
| | |
|---|---|
| *H04L 29/06* | (2006.01) |
| *H04W 76/40* | (2018.01) |
| *H04L 29/08* | (2006.01) |
| *H04W 4/06* | (2009.01) |

(Continued)

(52) U.S. Cl.
CPC .......... *H04L 65/4076* (2013.01); *H04L 67/30* (2013.01); *H04L 67/306* (2013.01); *H04W 4/06* (2013.01); *H04W 8/005* (2013.01); *H04W 76/40* (2018.02); *H04L 67/1061* (2013.01);

(Continued)

(58) Field of Classification Search
None
See application file for complete search history.

(56) References Cited

U.S. PATENT DOCUMENTS

| | | | |
|---|---|---|---|
| 8,918,088 B1 * | 12/2014 | Thodupunoori | ... G06Q 30/0251 455/3.06 |
| 9,055,102 B2 * | 6/2015 | Fiatal | ................ H04L 29/12122 |

(Continued)

OTHER PUBLICATIONS

PCT/EP2015/067798, International Search Report dated Oct. 8, 2015 (Two (2) pages).

(Continued)

*Primary Examiner* — Andrew C Oh
(74) *Attorney, Agent, or Firm* — Crowell & Moring LLP

(57) ABSTRACT

Data sets are transmitted to mobile terminals, which are connected by a radio network to a data server connected to a data network, wherein the data server is configured to transmit the data sets via the radio network to terminals located in a radio cell of the radio network as a broadcast signal or optionally as an individual signal directed specifically to one or more terminals, wherein a total signal emitted into the radio cell contains a corresponding broadcast signal part and a corresponding individual signal part. In one embodiment, a user profile is associated with each of the terminals identified in the radio cell and the content of the data sets transmitted in the broadcast signal part in accordance with a determined broadcast signal part factor is compiled in accordance with the information stored in the user profiles.

4 Claims, 1 Drawing Sheet

(51) Int. Cl.
*H04W 8/00* (2009.01)
*H04W 64/00* (2009.01)

(52) U.S. Cl.
CPC .......... *H04L 67/1063* (2013.01); *H04L 67/18* (2013.01); *H04W 64/003* (2013.01)

(56) References Cited

U.S. PATENT DOCUMENTS

| | | | | |
|---|---|---|---|---|
| 2002/0061754 | A1* | 5/2002 | Takano | H04M 1/72572 455/456.6 |
| 2003/0045305 | A1* | 3/2003 | Ogino | G01S 19/12 455/456.1 |
| 2004/0073924 | A1* | 4/2004 | Pendakur | H04H 60/06 725/46 |
| 2007/0298757 | A1* | 12/2007 | Ahn | G08B 27/006 455/404.1 |
| 2009/0069052 | A1* | 3/2009 | Jain | G06K 19/07739 455/558 |
| 2009/0254481 | A1* | 10/2009 | Lee | H04N 7/17318 705/51 |
| 2010/0151816 | A1* | 6/2010 | Besehanic | G06Q 30/02 455/405 |
| 2010/0319022 | A1* | 12/2010 | Praden | H04N 7/163 725/34 |
| 2011/0057836 | A1* | 3/2011 | Ische | G01S 5/0009 342/357.43 |
| 2012/0064923 | A1* | 3/2012 | Imes | G05B 15/02 455/457 |
| 2012/0093054 | A1* | 4/2012 | Liu | H04L 51/26 370/312 |
| 2012/0286998 | A1* | 11/2012 | Katsu | G01S 5/021 342/451 |
| 2013/0051331 | A1* | 2/2013 | Bao | H04W 28/24 370/329 |
| 2013/0057430 | A1* | 3/2013 | Yoon | G01S 19/22 342/357.61 |
| 2013/0111520 | A1 | 5/2013 | Lo et al. | |
| 2013/0231043 | A1* | 9/2013 | Tawfiq Moshtaha | G06Q 30/02 455/3.01 |
| 2013/0276035 | A1* | 10/2013 | Walker | H04N 21/44204 725/62 |
| 2014/0057664 | A1* | 2/2014 | Pei | H04W 64/006 455/456.5 |
| 2014/0269437 | A1 | 9/2014 | Kotecha et al. | |
| 2015/0235161 | A1* | 8/2015 | Azar | G06Q 10/063114 705/7.15 |
| 2015/0319472 | A1* | 11/2015 | Kotecha | H04N 21/25841 725/62 |
| 2015/0365864 | A1* | 12/2015 | Stalnacke | H04W 36/14 455/436 |
| 2016/0050114 | A1* | 2/2016 | Archibald | G06F 1/3206 370/254 |
| 2016/0072955 | A1* | 3/2016 | Barkan | H04M 3/42212 455/417 |
| 2016/0080792 | A1* | 3/2016 | Kosseifi | H04N 21/251 725/34 |
| 2016/0105880 | A1* | 4/2016 | Bao | H04L 12/189 370/312 |
| 2016/0301598 | A1* | 10/2016 | Strijkers | H04L 67/34 |

OTHER PUBLICATIONS

German Search Report issued in German counterpart application No. 10 2014 221 958.2 dated Jun. 1, 2015, with Statement of Relevancy (Eight (8) pages).

* cited by examiner

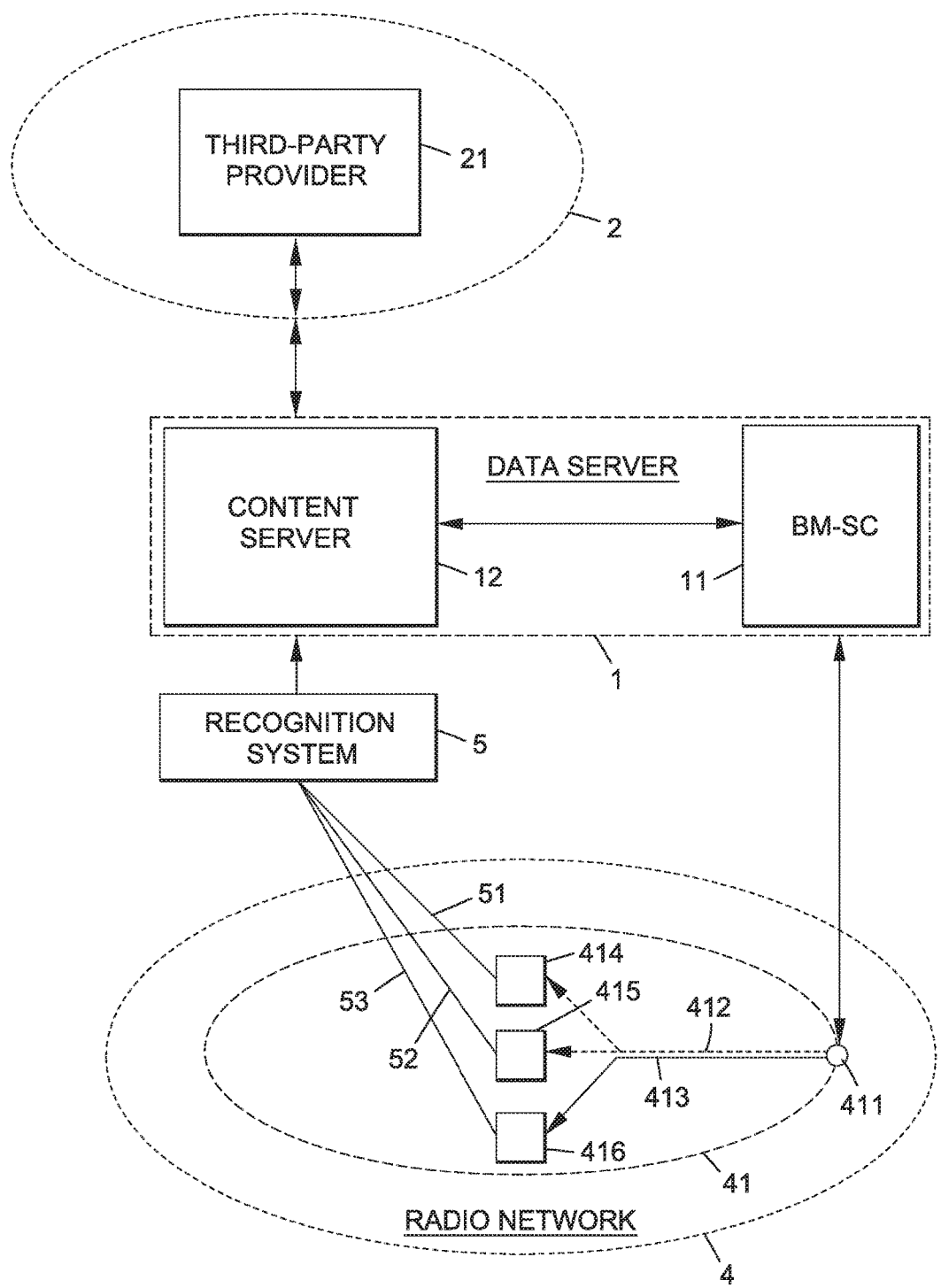

METHOD FOR TRANSMITTING DATA SETS TO MOBILE TERMINALS

CROSS REFERENCE TO RELATED APPLICATIONS

This application is a continuation of PCT International Application No. PCT/EP2015/067798, filed Aug. 3, 2015, which claims priority under 35 U.S.C. § 119 from German Patent Application No. 10 2014 221 958.2, filed Oct. 28, 2014, the entire disclosures of which are herein expressly incorporated by reference.

BACKGROUND AND SUMMARY OF THE INVENTION

The invention relates to a method for transmitting data sets to mobile terminals which are connected via a radio network to a data server connected to a data network, by means of which data server the data sets can be transmitted via the radio network to terminals located in a radio cell of the radio network as broadcast signal or optionally as an individual signal specifically directed to one or more terminals,
wherein a total signal sent out to the radio cell contains a corresponding broadcast signal part and a corresponding individual signal part, comprising the steps:
a) identifying the terminals located within the radio cell by the data server,
b) determining a preferred broadcast signal part factor for the total signal by the data server on the basis of a data requirement requested by the terminals identified within the radio cell,
c) transmitting a first component of the data sets in the broadcast signal part of the total signal and a second component of the data sets in the individual signal part of the total signal from the data server to the terminals, wherein the broadcast signal part of the total signal transmitted to the terminals is determined on the basis of the determined broadcast signal part factor preferred.

According to U.S. 2013/0051331 A1, a data server transmits data sets via an LTE network (Long Term Evolution Network) to mobile terminals such as, for example, smart phones or laptops by using an EMBMS protocol (Evolved Multimedia Broadcast Multicast Service Protocol). In the EMBMS, the data transmission takes place by a time division multiplex method in which a broadcast signal and a unicast signal are transmitted in the same frequency channel but in different time intervals.

In the known method, the data sets are transmitted, using the EMBMS protocol, via a total signal which is composed of a broadcast signal part and a unicast signal part to the terminals connected to a base station of the LTE network. For this purpose, the data server determines a preferred broadcast signal part factor for the total signal sent out. A broadcast signal part factor is understood to be, within the context of the present description, that temporal component in the total signal which is to be applied advantageously to the sending of data sets as broadcast signal. Typically, the component which is determined for this purpose is the one which is not needed in order to send out data sets which have to be sent out mandatorily as individual signal. In the known method, the data server takes into consideration for determining the preferred broadcast signal part factor the contents required by the terminals and, in particular, how many terminals have requested an identical content which can be transmitted by broadcast. By transmitting identical contents via the broadcast signal part of the total signal, the corresponding terminals no longer need to be addressed via the unicast signal part so that the overall transmitting capacity, only available to a limited extent, of the base station can be utilized efficiently. The data server adapts the component of the broadcast signal part in the total signal on the basis of the determined, preferred broadcast signal part factor, i.e. it assigns the corresponding time intervals for the transmission in the frequency channel to the broadcast signal part.

As is known, only a single, common content can be transmitted at the same time to the corresponding terminals during a broadcast transmission at a particular point in time, whereas, as part of the unicast transmission, different contents can be transmitted to different terminals. This greatly limits the known method particularly in situations in which many different contents are requested by the terminals at the same time. In such a scenario, only a few of the contents to be transmitted are identical so that only a correspondingly small part can also be transmitted as a result via the broadcast signal part of the total signal. A large part of the contents must thus be transmitted mandatorily in the unicast signal part which, however, due to the total transmitting capacity of the radio network which is available only to a limited extent, can frequently not be guaranteed. A part of the terminals which would have to be supplied with contents ideally via the unicast signal part must, therefore, also be addressed mandatorily via the broadcast signal part of the total signal in the case of the total transmitting capacity available being exceeded. As a result, the users of these terminals are, therefore, supplied with contents which may not correspond to their interests.

From U.S. 2013/0051331 A1, it is also known that during the determination of the preferred broadcast signal factor, the total number of the terminals connected to a base station of the radio network can also be taken into consideration. In this way, radio cells of the radio network can be identified, e.g., in which the total transmitting capacity is exceeded with a high probability and in which, therefore, supplying terminals via the broadcast signal part is particularly appropriate. Adapting the contents transmitted via the broadcast signal part to the interests of the corresponding users is, however, also not possible as a result.

It is an object of the present invention to develop a generic method in such a manner that the contents transmitted via the broadcast signal part correspond better to the interests of the respective users of the terminals.

This object may be achieved in conjunction with the features of the claimed invention, wherein terminals identified in the radio cell are, in each case, allocated a user profile and the content of the data sets transmitted in the broadcast signal part is assembled in dependence on the information deposited in the user profiles.

In one or more embodiments, a method according to the invention enables the content transmitted via the broadcast signal part to be assembled variably in dependence on the information deposited in the user profiles. In comparison with the method known from the prior art, a greater number of users can, as a result, be supplied with contents relevant to them via the broadcast signal part. The data server identifies for this, for example via the IP addresses, the terminals located within a radio cell of the radio network and assembles the content transmitted via the broadcast signal part of the total signal in accordance with the interests of the respective users. By this means, a content corresponding to their interests can be provided for all users, particularly also with insufficiently available total transmitting capacity of the radio network. The user profiles allocated to the terminals identified in a radio cell, such as smart phones or laptops, can be obtained by the data server in different ways in this context.

In one or more embodiments, a method according to the invention provides that the user profiles are obtained by the data server via the connected data network. Thus, the data server can obtain the user profiles, for example, via the Internet from third-party providers such as, for example, Facebook™, Google™ or last.fm. Said data server can call up the access data needed for this from the terminals, for example via a unicast signal. For this purpose, the access data can have been entered previously, e.g. by the user at the terminal or have been stored in it. Naturally, it is also possible that the user profiles, once they have been obtained via the data network, are stored for future use by the data server.

In one or more embodiments, a method according to the invention provides that the user profiles are generated by the data server. By this means, the access data of the user can be omitted completely. The data server can generate, for example via the IP addresses known to it and the contents requested by the respective terminals, a user profile correspondingly allocated to each terminal.

In one or more embodiments, a method according to the invention provides that the terminals located within the radio cell are recognized by a recognition system independent of the radio network, by means of which an item of recognition information is transmitted via the terminals located within the radio cell to the data server, so that the terminals located within the radio cell can be identified by it. Such an embodiment is particularly advantageous if the transmitting capacity of the radio cell is no longer adequate for being able to identify all terminals located in the radio cell via their IP address. In such a case, a vehicle, for example, can be representative for the femto cell implemented in it or the terminals, respectively, connected to it, which again enters into such a radio cell, can be advantageously identified by a GPS system independent of the radio network which then informs the data server about the entry of the vehicle into the radio cell. In this way, the vehicle can be identified via the data server and a correspondingly allocated user profile correspondingly taken into consideration during the assembly of the content transmitted into the radio cell via the broadcast signal part.

Further features and advantages of the invention are obtained from the subsequent special description and the drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows an illustration of an embodiment of the method according to the invention.

DETAILED DESCRIPTION OF THE DRAWINGS

FIG. 1 shows an illustration of an embodiment of the method according to the invention. In FIG. 1, a data server 1 can be seen which is constructed of a broadcast multicast service center (BM-SC) 11 and a content server 12. In this arrangement, the content server 12 is connected to a data network 2 via which it is connected to a third-party provider 21. In FIG. 1, it is also shown that the BM-SC 11 sends out a total signal consisting of a broadcast signal part 412 and an individual signal part 413 via a base station 411 of a radio cell 41 to the radio cell 41 which has been generated by using an EMBMS (evolved multimedia broadcast multicast service) protocol. The broadcast signal part 412 of the total signal is here transmitted to the terminals 414, 415, the individual signal part 413 to terminal 416. In the exemplary embodiment shown in FIG. 1, the individual signal part 413 is a unicast signal part. In FIG. 1 it is also shown that a recognition system 5 recognizes the terminals 414, 415, 416 via GPS signals 51, 52, 52 within the radio cell 41 of the LTE radio network 4 and transmits an item of recognition information to the content server 12. The content server 12 identifies the terminals 414, 415 and 416 by means of the recognition information and recognizes that these are located in the radio cell 41. The content server 12 obtains the user profiles allocated to the terminals 414, 415 and 416 from the third-party provider 21. On the basis of the information deposited in the user profiles, the content server determines in the exemplary embodiment shown in FIG. 1 that the users allocated to the terminals 414 and 415 have a similar taste in music and determines in agreement with the BM-SC 11, to which it is known via the base station 441 that the terminal 416 has requested an E-mail data set which can only be transmitted in the unicast signal part 413 of the total signal, a preferred broadcast signal part factor. In the exemplary embodiment represented in FIG. 1, the content server 12 and the BM-SC 11 determine as broadcast signal part factor the time intervals of the total signal which, apart from the time intervals mandatorily required for the transmission of the E-mail data set, are still available for a broadcast transmission. The content server 12 thereupon assembles music data sets, the content of which corresponds to the taste in music of the users of terminals 414 and 415 and which can be transmitted in the determined time intervals still available to the terminals 414 and 415. The content server 12 transmits the assembled data sets to the BM-SC 11 which transmits these in the broadcast signal part 412 of the total signal, which is determined by the time intervals still available for the broadcast transmission, to the terminals 414 and 415. At the same time, the BM-SC 11 transmits in the individual signal part 413 of the total signal the E-mail data set likewise previously transmitted from the content server 12, to the terminal 416.

Naturally, the embodiments discussed in the special description and shown in the figures only represent illustrative exemplary embodiments of the present invention. In the light of the present disclosure, the expert is provided with a wide spectrum of possible variations. For example, the individual signal part of the total signal does not mandatorily have to be a unicast signal part. Instead, each individual signal directed specifically to one or more terminals can be used for this purpose. The individual signal part can thus, in particular, also be a multicast signal part by means of which a specific group of terminals can be addressed via their IP addresses and supplied at the same time with a single, common content. The method according to the invention can be initiated by different events. E.g., an actual increase in the radio traffic (traffic load) can be detected by means of the incoming requests. However, an anticipation of a high traffic load on the basis of a high density of mobile devices is also possible which is actually detected or derived from contextual information of third-party providers, e.g. from congestion messages. Such a density of mobile devices can also be anticipated, in turn, from historical data.

LIST OF REFERENCE DESIGNATIONS

1 Data server
2 Data network

4 Radio network
5 Recognition system
11 BM-SC
12 Content server
21 Third-party provider
41 Radio cell
51, 52, 53 GPS signals
411 Base station
412 Broadcast signal part
413 Individual signal part
414, 415, 416 Terminals The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting data sets to mobile terminals which are connected via a radio network to a data server connected to a data network, wherein the data server is configured to transmit the data sets via the radio network to terminals located in a radio cell of the radio network as a broadcast signal or optionally as an individual signal specifically directed to one or more terminals, wherein a total signal sent out to the radio cell contains a corresponding broadcast signal part and a corresponding individual signal part, wherein the method comprises the acts of:

transmitting, via a recognition system independent of the radio network, an item of recognition information by each of a plurality of terminals; and receiving, by the data server, one or more of the respectively transmitted items of recognition information via the independent recognition system;

identifying, by the data server, one or more of the plurality of terminals as being located within the radio cell by virtue of receiving respective items of recognition information from such one or more terminals via the independent recognition system;

determining a preferred broadcast signal part factor for the total signal by the data server on the basis of a data requirement requested by the one or more terminals identified within the radio cell; and transmitting a first component of the data sets in the broadcast signal part of the total signal and a second component of the data sets in the individual signal part of the total signal from the data server to the one or more terminals, wherein the broadcast signal part of the total signal transmitted to the one or more terminals is determined based on the determined broadcast signal part factor preferred, and wherein the one or more terminals identified as being in the radio cell are, in each case, allocated a user profile and the content of the data sets transmitted in the broadcast signal part is assembled based on the information deposited in the user profiles.

2. The method as claimed in claim 1, wherein the user profiles are obtained by the data server via the data network.

3. The method as claimed in claim 1, wherein the user profiles are generated by the data server.

4. The method of claim 1, wherein the preferred broadcast signal part factor corresponds to those time intervals of the total signal which are available for a broadcast transmission by virtue of not being required for transmission of signals that have to be sent out mandatorily as individual signals.

* * * * *